E. E. HAUER.
PISTON.
APPLICATION FILED APR. 15, 1920.

1,377,346.

Patented May 10, 1921.

Witness

Inventor
Elmer E. Hauer
By Percy Norton Attorney

UNITED STATES PATENT OFFICE.

ELMER E. HAUER, OF SPRINGFIELD, OHIO.

PISTON.

1,377,346.

Specification of Letters Patent.

Patented May 10, 1921.

Application filed April 15, 1920. Serial No. 374,182.

*To all whom it may concern:*

Be it known that I, ELMER E. HAUER, a citizen of the United States, residing at Springfield, in the county of Clark and State of Ohio, have invented certain new and useful Improvements in Pistons, of which the following is a specification, reference being had therein to the accompanying drawings.

My invention relates to pistons and the object of my invention is to provide improved means for assembling and securing the packing or piston rings therefor in operative position without removing the body of the piston from the cylinder in which it is employed.

This I accomplish by simple and efficient means having a locking device insuring its safety and thereby save the time, trouble and expense of detaching and removing the body of the piston from the cylinder.

My invention consists of the constructions and combinations hereinafter more fully described and set forth in the claims.

Figure 1:
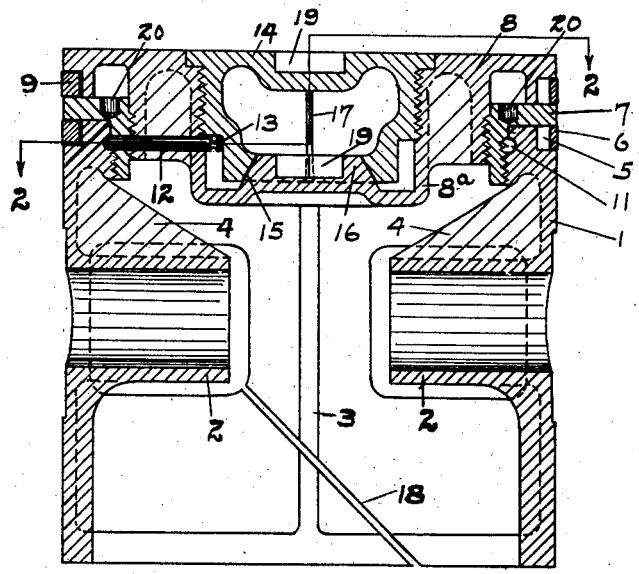
Figure 2:
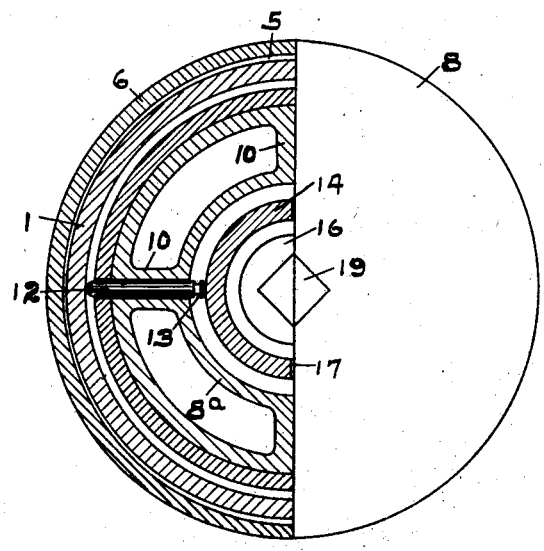

In the accompanying drawings which form a part of this specification Figure 1 is a longitudinal section of a piston embodying my invention and Fig. 2 is a cross section on the line of 2—2 of Fig. 1.

Referring to the drawings 1 represents the body of the piston which as will be seen is in the form of a hollow cylinder having oppositely disposed inwardly projecting bearings 2 adapted to carry a wrist pin for the connecting rod, the pin and rod not being shown as they operate in the usual well known manner. The cylindrical body 1 is provided with reinforcing ribs 3; and also the ribs 4 to strengthen and carry the bearings 2.

The cylindrical body 1 operates back and forth within the bore of a cylinder in the usual way and as will appear the piston or packing rings and their holding members are so constructed and arranged that they can be inserted through the end of the cylinder and secured to the body of the piston without removing it from the cylinder.

The cylindrical body 1 is provided with an offset forming an annular space 5 in which a piston ring 6 is seated; and a holding ring 7 screw threaded to the body 1 as shown holds the ring 6 in place. A head 8 screw threaded to the holding ring 7 as shown has an offset forming with the holding ring a groove in which a piston ring 9 is seated. The head 8 has a central inwardly projecting portion 8$^a$; and to reduce the weight of said head it is preferably made hollow as shown and is provided with webs 10.

The piston rings and their holding members being in place it is essential to lock them in place and for this purpose I provide an annular recess 11 in the body 1 and insert through a perforation in the web 10 of the head 8 and the holding ring 7 a pin 12 with its outer end extending into the recess 11. The pin 12 is preferably provided with a head 13 so that it can be easily inserted and removed. A hollow plug 14 is screw threaded to the head 8, as shown and said plug contacts the head 13 of the pin and thereby locks the holding ring 7 and head 8 from turning.

To tighten and hold the plug 14 against the pin head 13, I preferably provide the plug with a beveled edge 15 seating itself against a like bevel of a projection 16 on the head 8 and I split the plug at 17 so that when screwed down against the beveled projection 16 the plug will expand against the threaded opening and the pin 12.

The body 1 is split at 18 to adjust itself to the bore of the cylinder in which it is employed.

The cylinder head of the cylinder in which the piston is employed being removed it will be readily seen that without removing the body of the piston the screw plug 14, pin 12, head 8, piston ring 9, holding ring 7 and piston ring 6 can be removed in the order named and may be assembled in the reverse order.

Angular recesses 19 in the plug 13 and head 8 and pin holes 20 in the holding ring 7 are provided for suitable wrenches to screw the parts in place.

Having thus described my invention I claim:

1. In a piston the combination with a body and a piston ring, of a device to hold said ring in operative position and means including an expansible member to lock said device in holding position without removing said body from the cylinder in which it is employed.

2. In a piston the combination with a hollow cylindrical body and a piston ring of a device to hold said ring in operative position and means including an expansible member to lock said device in holding position without removing said body from the cylinder in which it is employed.

3. In a piston the combination with a hollow cylindrical body and a piston ring of a holding ring for said piston ring, said holding ring being screw threaded to the interior wall of said body and means including an expansible member to lock said holding ring in holding position without removing said body from the cylinder in which it is employed.

4. In a piston the combination with a hollow cylindrical body and a piston ring, of a device for holding said ring in operative position and means including an expansible member to lock said device in holding position, said holding device and locking means being removable from the cylinder in which they are employed without removing said body from said cylinder.

5. In a piston, a body and piston rings and means in combination with said body to form a plurality of annular grooves in which said rings are seated and a device including an expansible member to lock said means in assembled position, said groove forming means and locking device being removable from the cylinder in which they are employed without removing said body from said cylinder.

6. In a piston, the combination with a body having a wrist pin bearing disposed transversely to the line of movement of said piston and a piston ring, of a member to hold said ring in operative position, means to secure said member in holding position and a device to lock said securing means, all of said parts other than the body being removable from the cylinder in which they are employed without removing said body.

7. In a piston, the combination with a hollow cylindrical body and a piston ring, of a holding ring for said piston ring, said holding ring being screw threaded to the interior wall of said body, means to secure said holding ring in holding position and a device to lock said securing means, said holding ring, securing means and locking device being removable from the cylinder in which they are employed without removing said body.

8. In a piston, a body and piston rings and means in combination with said body to form a plurality of grooves in which said rings are seated, said means including members to hold said means in operative position, means to secure said holding members in holding position and a device to lock said securing means.

9. In a piston, a hollow cylindrical body and piston rings and holding members in combination with said body forming a plurality of grooves in which said rings are seated, the interior wall of said body having a recess, a pin projecting through perforations in said holding members into said recess to secure said members in holding position and means to lock said pin.

10. In a piston, a hollow cylindrical body and piston rings and holding members in combination with said body forming a plurality of grooves in which said rings are seated, one of said holding members forming the piston head and the inner wall of said body having an annular recess, a pin projecting through perforations in said holding members into said recess to secure said members in holding position and a screw plug secured to said head to lock said pin.

11. In a piston, a hollow cylindrical body and piston rings, the inner wall of said body having an annular recess, and holding members in combination with said body forming a plurality of grooves in which said rings are seated, a pin projecting through perforations in said holding members into said recess, one of said holding members having a beveled projection and a screw plug secured to said member and having a split end seated on said beveled projection and engaging said pin so that when said plug is tightened its split end will expand against the head of said pin.

In testimony whereof I have hereunto affixed my signature in the presence of two witnesses.

ELMER E. HAUER.

Witnesses:
CHASE STEWART,
W. A. BARBER.